J. F. MONTINE.
FRONT WHEEL DRIVE FOR AUTOMOBILES.
APPLICATION FILED MAR. 24, 1914.
1,132,861.
Patented Mar. 23, 1915.
3 SHEETS—SHEET 3.
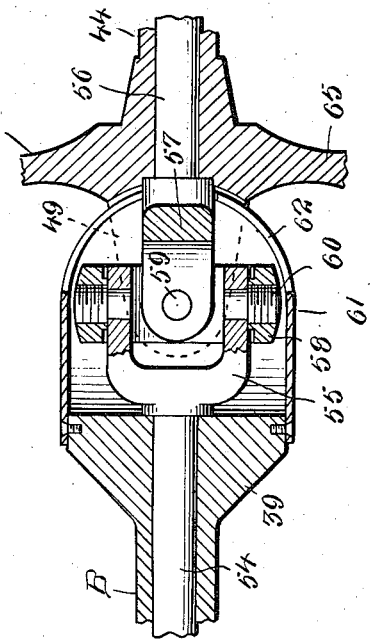
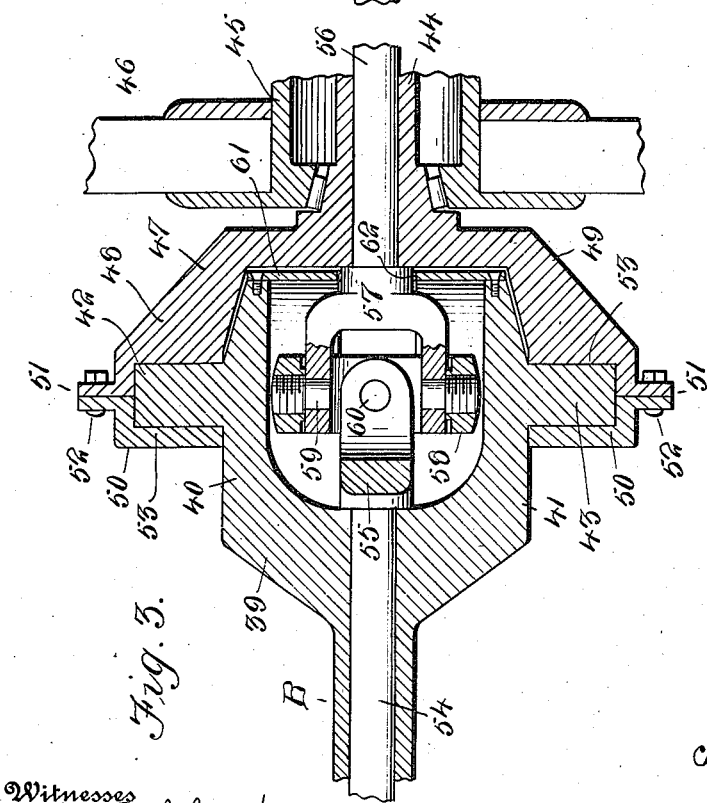
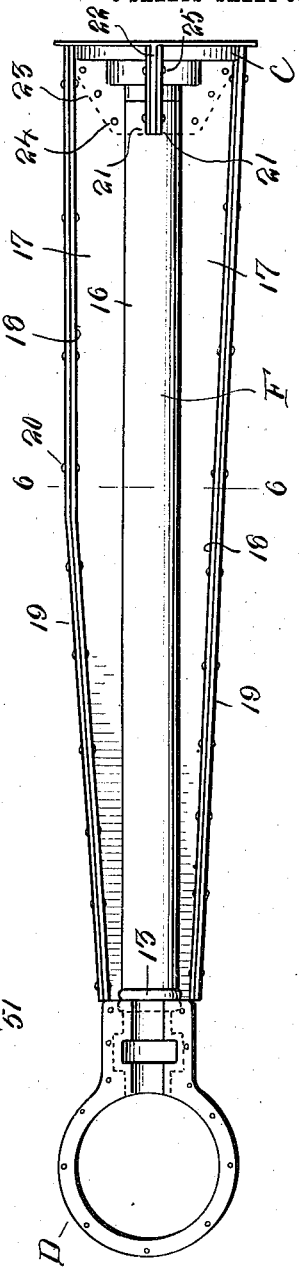
Inventor
J. F. Montine
By Victor J. Evans
Attorney
Witnesses

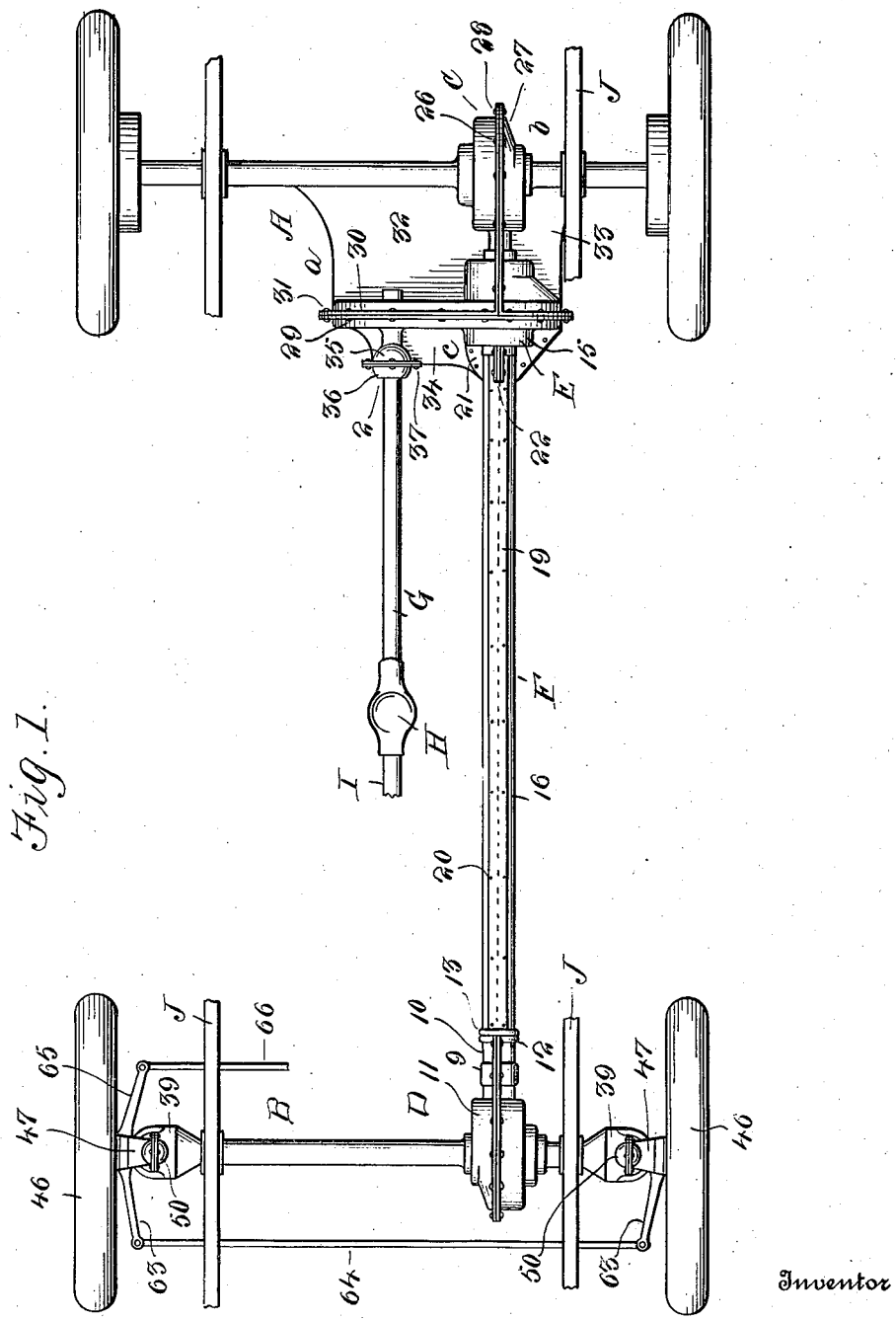

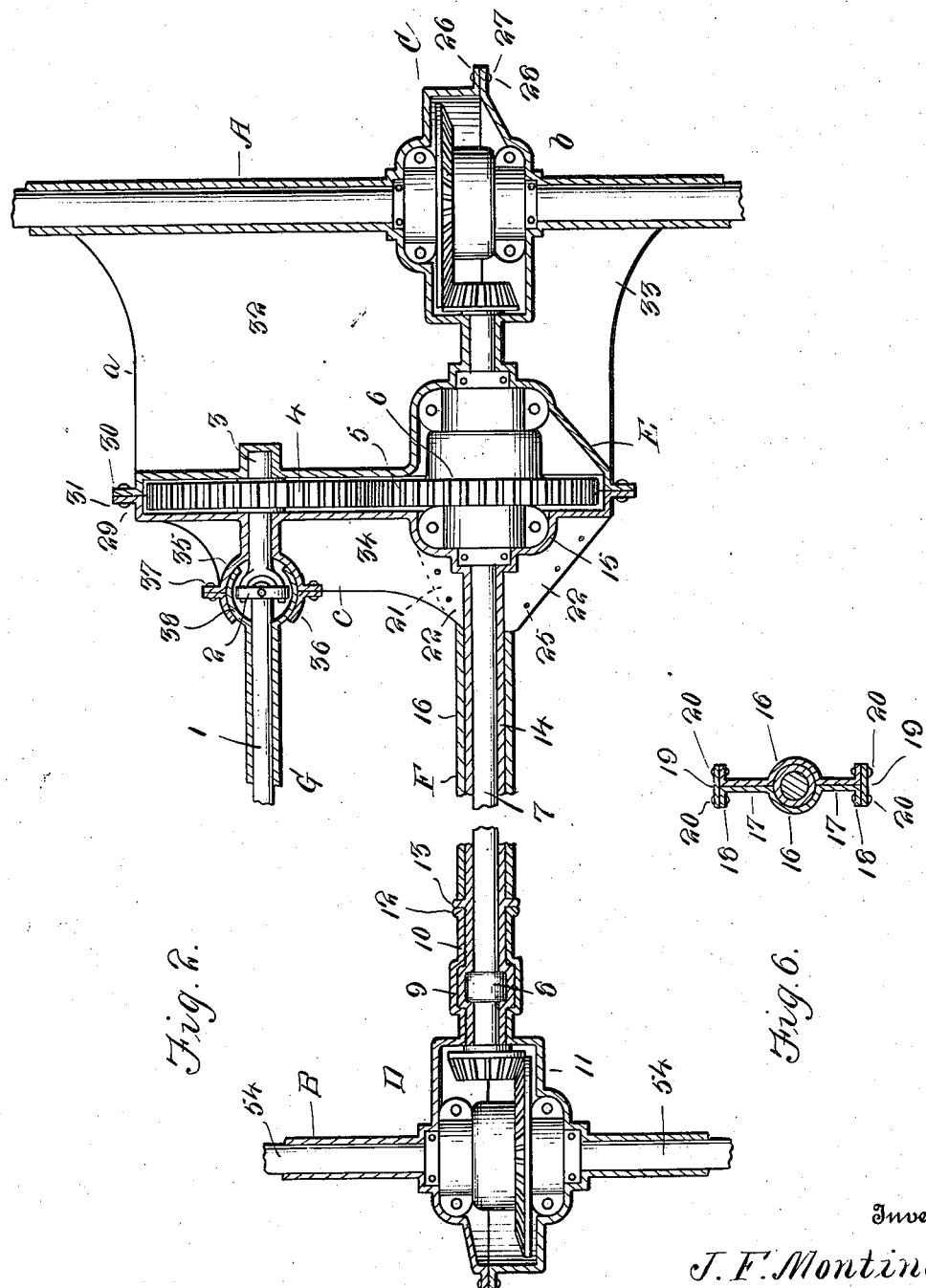

UNITED STATES PATENT OFFICE.

JOSEPH F. MONTINE, OF NEVINVILLE, IOWA.

FRONT-WHEEL DRIVE FOR AUTOMOBILES.

1,132,861.   Specification of Letters Patent.   Patented Mar. 23, 1915.

Application filed March 24, 1914. Serial No. 826,914.

*To all whom it may concern:*

Be it known that I, JOSEPH F. MONTINE, a citizen of the United States, residing at Nevinville, in the county of Adams and State of Iowa, have invented new and useful Improvements in Front-Wheel Drives for Automobiles, of which the following is a specification.

This invention relates to front wheel driving mechanism for motor vehicles, the object of the invention being to provide practical and efficient means for driving the front steering wheels of a motor car as well as the ordinary rear driving wheels thereof, at the same time providing for the necessary and ordinary variation in the speed of all of the driving wheels of the machine.

A further object of the invention is to provide special means for housing the several differential gearings hereinafter described and for bracing the differential shaft which is necessarily of considerable length especially in machines having a long wheel base, thus overcoming vibration and sagging of said long differential shaft.

A further object of the invention is to provide means for tying or holding together the differential housings adjacent to or upon the front and rear axles of the machine while at the same time admitting of the necessary torsional or twisting action of the frame in actual road work.

With the above and other objects in view, the invention consists in the novel construction, combination and arrangement of parts, as will hereinafter be more fully described, illustrated and claimed.

In the accompanying drawings:—Figure 1 is a plan view of the understructure of a motor vehicle, showing the front and rear wheel driving mechanism as contemplated in this invention. Fig. 2 is an enlarged sectional view of the driving mechanism illustrated in Fig. 1. Fig. 3 is an enlarged detail vertical section through one of the steering knuckles and the universal joint, showing also a portion of one of the steering wheels. Fig. 4 is a detail horizontal section taken at right angles to Fig. 3. Fig. 5 is a side elevation of the housing truss for the differential shaft, showing also portions of the rear and intermediate differential housings. Fig. 6 is a detail vertical cross section on the line 6—6 of Fig. 5.

Referring primarily to Fig. 1, A designates the rear axle housing, B the front axle housing, C the rear differential housing and D the front differential housing, and it may be stated at this point that the front axle together with its differential gearing is substantially a duplicate of the rear axle and its differential gearing, the parts hereinabove described being similar in construction and arrangement to the corresponding parts now in common use on automobiles.

In carrying out the present invention I provide intermediate differential gearing indicated generally at E, the said intermediate differential gearing being associated with a differential shaft the housing of which is indicated at F in Fig. 1, said housing being of considerable length and being adapted to support the differential shaft which is necessarily quite long, reaching from the front differential gearing D to the intermediate differential gearing E.

G designates the drive shaft housing, H the universal joint casing or boot and I the transmission shaft which extends to and is driven by the engine shaft (not shown).

Referring now to Fig. 2, the drive shaft 1 which is inclosed in the housing tube G above referred to is connected by a universal joint at 2 to an extension shaft 3 having fast thereon a spur gear wheel 4 which meshes directly with another spur gear wheel 5 on the outer peripheral face of the large differential gear 6 contained in the housing E above referred to, the motion of the drive shaft being thus transmitted to the differential shaft 7.

The shaft 7 has its front end in driving connection with the differential gearing D and its rear end in driving engagement with the rear differential gearing C as clearly shown in Fig. 2 so that the power of the engine is first transmitted to the drive shaft 1 and then to the sections of the differential shaft 7 at each side of the differential gearing E and thence through the differential gearings C and D to the rear and front axles, respectively.

The shaft 7 is provided adjacent to the differential gearing C with a fixed collar 8 which is received in a recessed enlargement 9 formed in a sleeve-like extension 10 of the rear differential housing 11 so that the shaft 7 serves to tie the front and rear constructions together. The sleeve-like extension 10 terminates at its forward end in a bead or flange 12 which bears in contact with a corresponding bead or flange 13 on the rear extremity of a housing truss which is shown in section in Fig. 2 and in side elevation in Fig. 5 and which will be described in detail. Immediately surrounding the shaft 7 is the usual housing tube 14, said tube extending from the rear differential housing 11 to the intermediate differential housing section 15.

The housing truss surrounds the tube 14 and is constructed as best illustrated in Figs. 5 and 6 wherein it will be observed that said housing truss is divided along a vertical line extending diametrically of the shaft 7 into similar sections as seen in Fig. 6, each of said sections embodying a semi-circular or semi-cylindrical body portion 16, opposite webs 17, and laterally extending flanges 18 at the outer edges of the webs 17. When the two sections of the housing truss are brought together in the relation shown in Fig. 6, they are securely tied together by means of the tie-plates 19 arranged at the top and bottom of the truss and fastened to the flanges 18 by means of bolts or rivets 20. The webs extend upwardly and downwardly as indicated in Fig. 6 and also shown in the side elevation Fig. 5 and in addition to said vertically extending webs, the sections of the housing truss are provided at their rear ends with lateral attaching flanges 21 which are spaced a suitable distance apart to receive between them corresponding flanges or webs 22 extending forwardly from the section 15 of the intermediate differential gearing housing. Other vertical flanges or webs 23 on the housing section 15 are received between the webs 17 as indicated by dotted lines in Fig. 5 and the parts bolted together as shown at 24 and 25 thereby securely fastening the housing truss to the intermediate differential gearing housing.

Referring now to Figs. 1 and 2, it will be seen that the differential gearings C and E as well as the spur gear 4, are inclosed in a common housing embodying triple sections indicated at *a*, *b* and *c*. The sections *a* and *b* are divided from each other along a line extending longitudinally of the machine and defined by flanges 26 and 27 bolted together as at 28. The section *c* is divided from the other two sections along a line extending transversely of the machine frame and defined by the flanges 29 and 30 bolted together as at 31. The section *a* is connected and braced relatively to the rear axle housing A by means of a uniting web 32 and the section *b* is likewise connected to the rear axle housing by means of a similar uniting web 33. The section *c* is also provided with a bracing web 34 which last named web also merges into and braces the fixed member 35 of a ball-socket, said socket also embodying a separable or detachable section 36 secured to the fixed section by bolts 37 or their equivalent. The socket 35 as shown in Fig. 2 receives a hollow ball joint member 38 formed on the rear end of the housing G for the drive shaft 1.

J, in Fig. 1, represents the side bars of the frame or chassis of the machine.

Referring now to Figs. 3 and 4, the front axle housing B is enlarged at each end to form a knuckle 39 embodying spaced upper and lower members 40 and 41, respectively, the same being provided with the upwardly and downwardly extending pintles 42 and 43. 44 designates the tubular bearing for the hub 45 of one of the steering wheels 46. At its inner end the bearing 44 is enlarged to form a knuckle 47 comprising the upper and lower members 48 and 49, respectively, and including a detachable section 50 which together with the members 48 and 49 is flanged as shown at 51 to receive bolts 52 whereby the section 50 is fastened to the knuckle 47. In the meeting faces of the members 50 and 48, sockets 53 are formed in which the pintles 42 and 43 are adapted to turn in changing the angle of the steering wheel. The adjacent front axle section 54 is provided at its outer end with a fork 55 and the wheel driving spindle 56 which passes through the tubular bearing 44 is provided at its inner end with a fork 57. Extending around both forks 55 and 57 is a yoke ring 58 carrying a pair of diametrically opposite pivot studs 59 which are journaled in openings in the fork 57, and another pair of pivot studs 60 are journaled in the arms of the fork 55 as clearly shown in Figs. 3 and 4. This forms a universal joint connection between the shaft section 54 and the wheel driving spindle 56, permitting the members 54 and 56 to be turned relatively to each other to effect the steering of the machine while at the same time transmitting the power of the motor to each of the steering wheels.

The outer portion of the knuckle 39 is rounded in semi-circular form as illustrated in Fig. 4 and a facing plate 61 is secured to such rounded end portion of the knuckle and provided with a slot 62 to allow for the sweep of the spindle 56 as illustrated in Figs. 3 and 4. This face plate acts to exclude foreign matter from the interior of the knuckle and the working parts of the universal joint. Each knuckle is provided with arms 63 extending either forwardly or rearwardly therefrom as shown in Fig. 1, said arms being coupled together for simultaneous operation by means of a connecting rod 64. One of the knuckles is provided with an additional arm 65 to which is attached a steering connection 66 controlled by the ordinary steering wheel now in common use in automobiles, motor trucks and the like.

It will be apparent that the steering and driving mechanism as shown applied to the front of the machine in Fig. 1 may also be applied to the rear of the machine so as to enable the rear wheels to be turned to correspond with the angles assumed by the front wheels, this being accomplished by merely duplicating the steering knuckle and wheel driving arrangement hereinabove described and illustrated in detail in Figs. 3 and 4.

What I claim is:—

1. In front wheel driving mechanism for motor vehicles, the combination of a sectional rear axle, a sectional front axle, rear axle differential gearing, front axle differential gearing, a sectional fore and aft differential shaft connected at opposite ends with the said front and rear axle differential gearing, intermediate differential gearing incorporated in said differential shaft and connecting the sections of said shaft, a master spur gear for said intermediate differential gearing, the intermediate differential gearing being located in close proximity to one of the first named differential gearings, a drive shaft parallel to said differential shaft, a spur gear on said drive shaft meshing with the master gear of the intermediate differential gearing, a sectional housing inclosing both of said proximal differential gearings and the spur gear on the drive shaft, and a webbed housing truss extending from said intermediate to the remaining differential housing and inclosing said differential shaft.

2. In front wheel driving mechanism for motor vehicles, the combination of a sectional rear axle, a sectional front axle, rear axle differential gearing, front axle differential gearing, a sectional fore and aft differential shaft connected at opposite ends with the said front and rear axle differential gearing, intermediate differential gearing incorporated in said differential shaft and connecting the sections of said shaft, the intermediate differential gearing being located in close proximity to one of the first named differential gearings, a sectional housing inclosing both of said proximal differential gearings, a webbed housing truss extending from said intermediate to the remaining differential housing and inclosing said differential shaft, said housing truss embodying sections which are separable on the diametrical line of said shaft, flanges extending laterally from opposite sides of said truss sections, and tie-plates connecting said flanges.

In testimony whereof I affix my signature in presence of two witnesses.

JOSEPH F. MONTINE.

Witnesses:
 GUY HEFLEN,
 JAMES KOSAR.